United States Patent [19]
Weltmann

[11] Patent Number: 5,387,950
[45] Date of Patent: Feb. 7, 1995

[54] PRESCRIPTION EYEWEAR MADE FROM NON-PRESCRIPTION LENS SHIELD MATERIAL

[76] Inventor: Alfred Weltmann, 9052 A Niles Central Rd., Skokie, Ill. 60076

[21] Appl. No.: 934,119

[22] Filed: Aug. 21, 1992

Related U.S. Application Data

[63] Continuation of Ser. No. 565,226, Aug. 9, 1990, abandoned.

[51] Int. Cl.$^6$ ............................................. G02C 13/00
[52] U.S. Cl. .................................... 351/178; 351/154; 2/441; 2/443
[58] Field of Search ....................... 351/41, 43, 47, 57, 351/154, 178; 2/431, 440, 441, 442, 443, 444

[56] References Cited

U.S. PATENT DOCUMENTS

| | | | |
|---|---|---|---|
| 1,659,165 | 2/1928 | Sangren | 351/154 |
| 1,721,194 | 7/1929 | Tillyer | 351/154 |
| 3,517,415 | 6/1970 | McGrath et al. | 351/178 |
| 3,824,006 | 7/1974 | Voit | 351/178 |
| 3,838,914 | 10/1974 | Fernandez | 351/41 |
| 3,904,282 | 9/1975 | Batista | 351/154 |
| 4,021,103 | 5/1977 | Gaspari | 351/154 |
| 4,051,557 | 10/1977 | Bengtson et al. | 351/43 |
| 4,340,282 | 7/1982 | Murakami | 351/154 |
| 4,810,080 | 3/1989 | Grendol et al. | 351/41 |
| 4,943,152 | 7/1990 | Whelen | 351/47 |
| 5,191,364 | 3/1993 | Kopfer | 351/43 |

FOREIGN PATENT DOCUMENTS 0042049 4/1978 Japan ................................. 351/178

*Primary Examiner*—Loha Ben
*Assistant Examiner*—Thomas Robbins
*Attorney, Agent, or Firm*—Drucker & Sommers

[57] ABSTRACT

Prescription eyewear is disclosed comprising a non-prescription one-piece plastic lens shield within the periphery of which generally central apertures have been formed, and prescription lenses are permanently affixed within said apertures. The lens shield are generally obtained from optically defective lens shield material since apertures are to be cut out centrally from the lens shield. Alternatively, the non-prescription lens shield may be optically correct and, of course, may still be the source of the prescription eyewear.

9 Claims, 1 Drawing Sheet

PRESCRIPTION EYEWEAR MADE FROM NON-PRESCRIPTION LENS SHIELD MATERIAL

CROSS REFERENCE TO RELATED APPLICATION

This application is a continuation application of application Ser. No. 07/565,226, filed Aug. 9, 1990 now abandoned.

BACKGROUND OF THE INVENTION

Unitary, or one-piece lens shields for eyewear, made of optically correct, molded, plastic material have become popular in the USA and elsewhere in the world. Such lens shields are provided with a carrier which engages and holds the lens shield. The carrier has means to carry the temples.

While such non-prescription unitary lens shields eyewear are very popular for the bulk of the population there is no simple, inexpensive way for a person, who needs prescription eyewear to wear such non-prescription one-piece lens shields. Various attempts have been made, of which we are aware, such as overlying prescription lenses onto the interior surface of the existing lens shield—but this is unsightly, difficult to execute perfectly and expensive.

It is therefore an object of this invention to achieve a method and means for the manufacturer of prescription eyewear from non-prescription lens shield material in a simple and inexpensive way. Moreover, most lens shields are made from a polycarbonate or acrylic material. In molding such lens shields great care must be taken in achieving an optically correct lens shield, e.g., one without any waves or else optical distortion will result. In actual manufacturing practice, wastage of between 15% and 30% traditionally results in the making of such lens shield material. It is an object of this invention to utilize this defective lens shield material as the primary source of lens shield material, and secondarily to utilize optically correct lens shield material if defective lens material is not available.

BRIEF SUMMARY OF THE INVENTION

A prescription lens shield is made from non-defective or defective non-prescription one-piece lens shield by cutting out, on either side of a central axis, a pair of apertures from the already existing lens shield. Within those apertures is permanently affixed the prescription lens elements. The result is a simple, inexpensive prescription lens shield. The prescription lens elements are readily affixed to the formed apertures by, e.g., a ridge and groove construction. The cost of the finished prescription lens shield will be minimized in that defective lens shield may be utilized by simply cutting out the defective areas of the lens shield material and replacing them with prescription lenses. Alternatively, lens shields may be molded, initially, with lens apertures contained therein.

DETAILED DESCRIPTION OF THE INVENTION

The numeral 10 refers to the finished prescription lens shield having a carrier element 11 and connecting temples 13, of conventional construction. The prescription lens shield 10 is normally formed from a non-prescription one-piece lens shield (not shown) which is standard in the eyewear field. The standard one-piece lens shield is made of thin plastic, is somewhat curved, tinted and usually made ultra-violet resistant. Such lens shields are generally made of molded acrylic or polycarbonate plastic, and cannot be wavy or have any other optical distortion, such as scratches, gouges orange peeling of the plastic, or incorrect curvature of the plastic lens shield, which would interfere with and/or distort the wearer's vision in the view line through the lens shield. In spite of vigorous attempts at reducing the quantity of optical distortion resulting from the molding process, from 15%–30% wastage is traditionally found to occur. Such defective lens shields are preferably utilized to form the non-prescription lens shields of this invention. Also, within the scope of this invention, one can employ as the starting or source material lens shield material which is optically correct.

Figure 1:
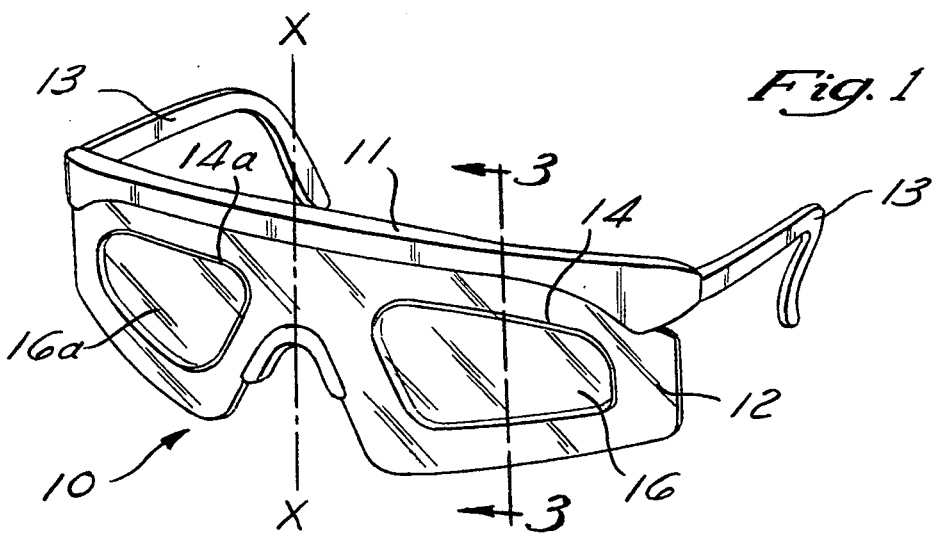
FIG. 1 is a perspective view of a finished prescription lens shield of this invention.
Figure 2:
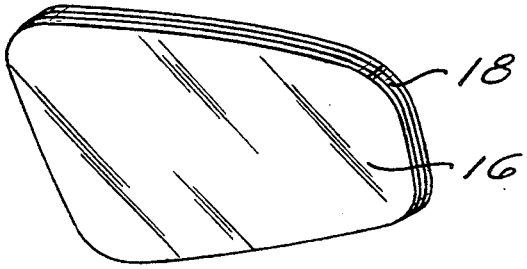
FIG. 2 is a side elevational view of a prescription lens of this invention.
Figure 3:
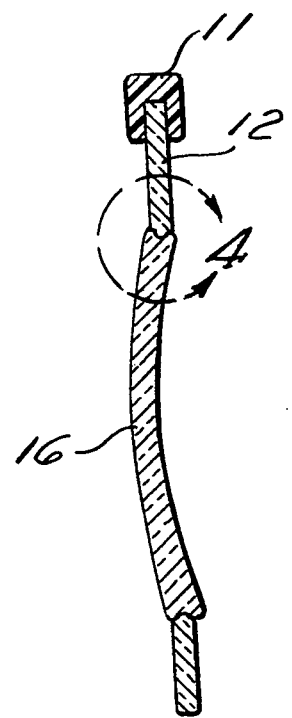
FIG. 3 is a cross-sectional view taken along the line 3—3 of FIG. 1.
Figure 4:
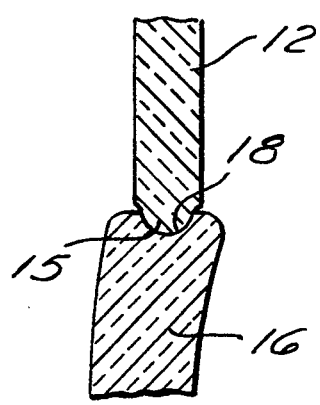
FIG. 4 is an enlarged view of FIG. 3, taken along the arcuate line 4—4 of FIG. 3.
Figure 5:
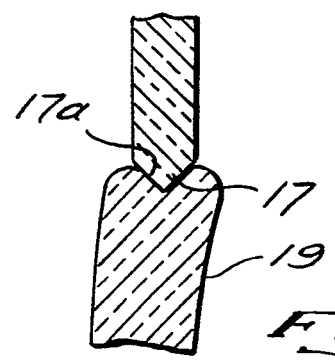
FIG. 5 is an enlarged view similar to that of FIG. 4, but showing a second means of affixation of prescription lens element to lens shield.

The lens shield 12 has apertures 14, 14a cut out from the lens shield on either side of a central transverse axis (x—x in FIG. 1), and adapted to overly the eyes of the user. The periphery of the apertures 14, 14a are then preferably formed with ridges 15 by a conventional grinding operation. The ridges 15 are preferably arcuate in cross-section and continuous throughout the periphery of the apertures but need not extend continuously around the periphery of the apertures. The term "periphery" as used herein, is intended to include a continuous peripheral element which may be continuous or which may extend over only a portion of the periphery of the apertures 14, 14a. The ridge element may also be V-shaped in cross-section, as shown at 17 in FIG. 5, with a corresponding V-shaped groove 17a formed in a prescription lens element 19, or may be rectangular in cross-section.

Prescription lens 16, 16a are then formed in a conventional manner except that peripheral grooves 18 are ground in the outer edges of the prescription lens in a conventional manner. The lens shield is heated to a temperature of about 150°–200° F. depending on the lens shield material to render it pliable, and the prescription lens grooves are then aligned with and snapped onto the lens shield ridge 15. Upon cooling, the prescription lenses 16, 16a are permanently affixed to, and retained within, the lens shield apertures 14, 14a.

The prescription lenses 16, 16a are preferably tinted the color of the lens shield material. It is also to be noted that the lenses may be, and are usually thicker than the lens shield material, and readily accommodate the grooves 18 and 17a.

I claim:

1. A process for forming prescription eyewear from a unitary non-prescription generally planar lens shield which is optically defective, comprising the steps of:

(a) providing a unitary non-prescription generally planar lens shield having a pair of apertures formed therein which lie in front of the eyes of the wearer, each aperture having a first peripheral ridge formed along its peripheral edges;

(b) fabricating a pair of prescription lens sized to fit in said pair of apertures, each having a second peripheral groove designed to interfit with said first peripheral surface; and (c) permanently affixing said pair of prescription lenses in said pair of apertures in said lenses shield by heating said lens shield and the apertures therein, installing said prescription lenses in said heated apertures, and cooling said lens shield to thereby permanently affix said prescription lenses in said lens shield.

2. The product formed by the process of claim 1.

3. In a process for making prescription eyewear from a unitary optically defective non-prescription lens shield, the improvement which comprises:

forming a pair of spaced apart apertures within said lens shield, each aperture having a peripheral ridge along its edge, said apertures being spaced so as to overlay the eyes of a user;

fabricating a pair of prescription lenses of the same size as said apertures and forming, in said prescription lenses, peripheral grooves adapted to interfit with said peripheral ridges of said apertures; and permanently affixing said prescription lenses within said apertures by heating said lens shield to a sufficient temperature to render said lens shield pliable, interfitting said ridges of said prescription lenses within the groves of said apertures of said heated lenses shield, and cooling said lens shield so as to fixedly retain the ridges of said lens shield within the grooves of said prescription lenses, the process thereby resulting in prescription eyewear in a non-prescription lens shield.

4. The process of claim 3 wherein the material of said lens is selected from a plastic material.

5. The process of claim 3 wherein the material of said lens shield is selected from an acrylic or poly carbonate plastic.

6. A process for forming prescription eyewear from a unitary non-prescription generally planar lens shield which overlays both eyes of a prescription eyewear user, comprising the steps of:

(a) providing a unitary non-prescription generally planar lens shield which is optically defective;

(b) forming a pair of spaced apertures entirely within said lens shield, said apertures being spaced apart so as to lie in front of both the eyes of the user, and forming a peripheral ridge along the edge of each said pair of apertures;

(c) fabricating a pair of prescription lenses, and forming along each peripheral edge of each said pair of prescription lenses a peripheral groove complementary to and interfitting with said peripheral ridge of said apertures;

(d) fixably retaining said prescription lenses within said apertures by first heating said lens shield to a sufficient temperature to render said lens shield pliable, then inserting one of each said lenses into one of each said apertures in said lens shield to snappedly retain said lenses in said lens shield, and lastly cooling said lens shield so as to fixably retain said lenses in said lens shield.

7. The process of claim 6, wherein said apertures are formed in said lens shield by a cutting operation.

8. The product formed by the process of claim 7.

9. A process for forming prescription eyewear from a unitary non-prescription generally planar lens shield which overlays both eyes of a prescription eyewear user, comprising the steps of:

(a) providing a unitary non-prescription generally planar lens shield which is optically defective;

(b) forming a pair of spaced apertures entirely within said lens shield, said apertures being spaced apart so as to lie in front of both the eyes of the user;

(c) forming a peripheral ridge along the edge of each said pair of apertures;

(d) fabricating a pair of prescription lenses;

(e) forming along each peripheral edge of each said pair of prescription lenses a peripheral groove complementary to and interfitting with said peripheral ridge of said apertures; and (f) fixably retaining said prescription lenses within said apertures by heating said lens shield to a sufficient temperature to render said lens shield pliable, inserting one of each said lenses into one of each said apertures in said lens shield to snappedly retain said lenses in said lens shield, and cooling said lens shield so as to fixably retain said lenses in said lens shield.

* * * * *

REEXAMINATION CERTIFICATE (2997th)
United States Patent [19]
Weltmann

[11] B1 5,387,950
[45] Certificate Issued Sep. 10, 1996

[54] PRESCRIPTION EYEWEAR MADE FROM NON-PRESCRIPTION LENS SHIELD MATERIAL

[76] Inventor: Alfred Weltmann, 9052 A Niles Central Rd., Skokie, Ill. 60076

Reexamination Request:
No. 90/003,904, Jul. 17, 1995

Reexamination Certificate for:
Patent No.: 5,387,950
Issued: Feb. 7, 1995
Appl. No.: 934,119
Filed: Aug. 21, 1992

Related U.S. Application Data

[63] Continuation of Ser. No. 565,226, Aug. 9, 1990, abandoned.
[51] Int. Cl.$^6$ .................................... G02C 13/00
[52] U.S. Cl. ................ 351/178; 351/154; 2/441; 2/443

[58] Field of Search .................. 351/41, 43, 47, 351/57, 154, 178; 2/441, 443

[56] References Cited

U.S. PATENT DOCUMENTS

4,051,557  10/1977  Bengtson et al. .................... 2/430

FOREIGN PATENT DOCUMENTS

1647866  3/1992  Japan .

*Primary Examiner*—Georgia Y. Epps

[57] ABSTRACT

Prescription eyewear is disclosed comprising a non-prescription one-piece plastic lens shield within the periphery of which generally central apertures have been formed, and prescription lenses are permanently affixed within said apertures. The lens shield are generally obtained from optically defective lens shield material since apertures are to be cut out centrally from the lens shield. Alternatively, the non-prescription lens shield may be optically correct and, of course, may still be the source of the prescription eyewear.

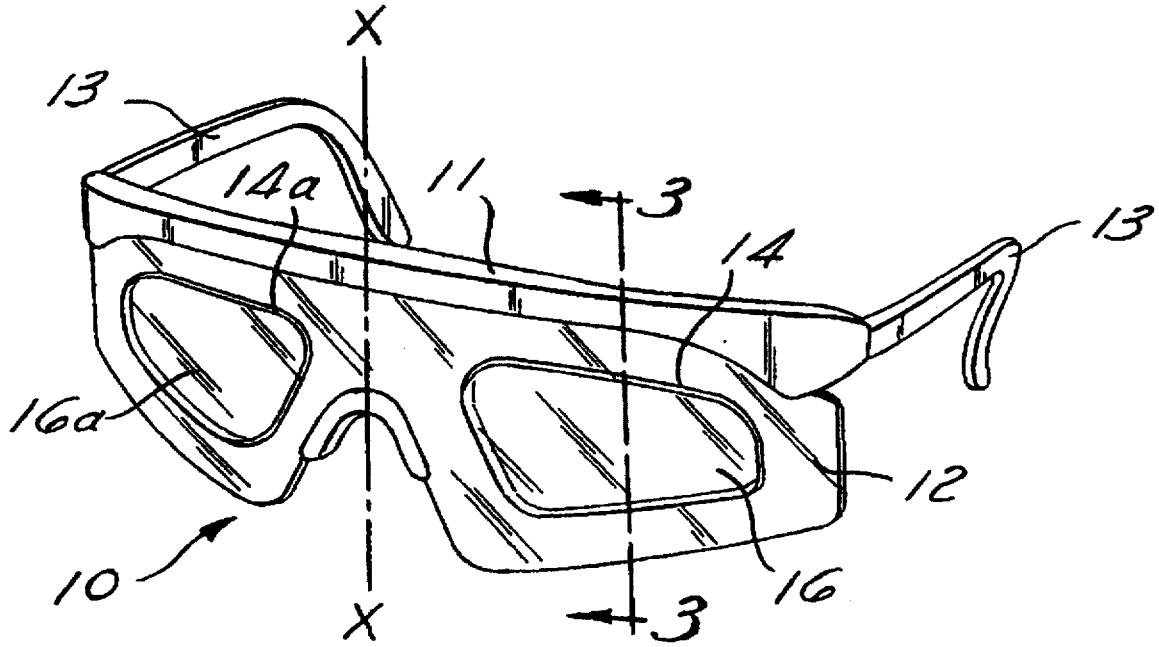

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *